United States Patent
Shryock

(10) Patent No.: US 11,106,611 B2
(45) Date of Patent: Aug. 31, 2021

(54) CONTROL SYSTEM MIGRATION USING INTERFACE CARD

(71) Applicant: Baker Hughes Oilfield Operations LLC

(72) Inventor: Chad Michael Shryock, Longmont, CO (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/709,245

(22) Filed: Dec. 10, 2019

(65) Prior Publication Data

US 2021/0173798 A1 Jun. 10, 2021

(51) Int. Cl.
G06F 13/20 (2006.01)

(52) U.S. Cl.
CPC ...... *G06F 13/20* (2013.01); *G06F 2213/3808* (2013.01)

(58) Field of Classification Search
CPC ............. G06F 13/4081; G06F 13/409; G06F 11/0709; G06F 9/4413; G06F 13/20; G06F 2213/3808
See application file for complete search history.

(56) References Cited

U.S. PATENT DOCUMENTS

| | | | |
|---|---|---|---|
| 5,488,705 A * | 1/1996 | LaBarbera | G06F 13/409 710/305 |
| 6,324,608 B1 * | 11/2001 | Papa | H05K 7/1492 710/104 |
| 8,241,063 B2 * | 8/2012 | Nagata | H01R 12/724 439/607.01 |
| 8,719,520 B1 | 5/2014 | Piszczek et al. | |
| 9,966,714 B1 * | 5/2018 | Sreedharan | H01R 9/2675 |
| 2002/0019958 A1 * | 2/2002 | Cantwell | H04L 49/557 714/11 |
| 2004/0215865 A1 * | 10/2004 | Arimilli | G06F 13/4081 710/302 |
| 2005/0258243 A1 | 11/2005 | Hsieh | |

(Continued)

FOREIGN PATENT DOCUMENTS

| EP | 0542657 B1 | 4/1998 |
|---|---|---|
| JP | 4037805 B2 | 11/2007 |

(Continued)

OTHER PUBLICATIONS

"Control System Service Life cycle management for Procontrol P13 and Advant Power", ABB Switzerland Ltd., Feb. 2015, 1-11.

(Continued)

*Primary Examiner* — Raymond N Phan
(74) *Attorney, Agent, or Firm* — Mintz Levin Cohn Ferris Glovsky and Popeo, P.C.

(57) ABSTRACT

Systems, methods, and devices are provided for migrating field device data signals from a first control system to a second control system using an interface card. An interface card can be configured to couple to a first and second terminal block cable assembly, respectively associated with a first and second control system. The interface card and system herein can maintain a field device data channel assignment configuration when migrating control and data I/O of the field device from the first control system to the second control system.

24 Claims, 4 Drawing Sheets

(56) References Cited

U.S. PATENT DOCUMENTS

| | | | |
|---|---|---|---|
| 2007/0083625 A1* | 4/2007 | Chamdani | H04L 67/1097 709/223 |
| 2008/0244104 A1* | 10/2008 | Clemente | H04L 12/40013 710/11 |
| 2008/0288120 A1 | 11/2008 | Lindenmuth et al. | |
| 2009/0010266 A1 | 1/2009 | Yao et al. | |
| 2010/0077111 A1* | 3/2010 | Holmes | H04L 12/40013 710/33 |
| 2010/0185857 A1* | 7/2010 | Neitzel | G05B 19/0428 713/168 |
| 2016/0092386 A1* | 3/2016 | Sakamoto | G06F 13/387 710/106 |
| 2019/0243793 A1* | 8/2019 | Karb | G05B 19/054 |
| 2020/0103946 A1* | 4/2020 | Law | G06F 1/1698 |
| 2020/0253076 A1* | 8/2020 | Pakimo | H05K 7/1465 |

FOREIGN PATENT DOCUMENTS

| | | |
|---|---|---|
| KR | 10-2019-0049217 A | 5/2019 |
| WO | 2006-130000 A1 | 12/2006 |

OTHER PUBLICATIONS

"Fire Alarm Control Panel Upgrade Package", Simplex, 2014, 1-2.

"Migrate from Cisco Catalyst 6500 Series Switches to Cisco Nexus 9000 Series Switches", Cisco Systems, Inc., Nov. 2013, 1-15.

"WDPF®-to-Ovation® Migration Increasing Your Performance While Preserving Your Investment", Emerson Process Management, Power & Water Solutions, Inc., 2007, 1-12.

International Search Report and Written Opinion issued in corresponding International Application No. PCT/US2020/062864, dated Mar. 15, 2021, 9 pages.

* cited by examiner

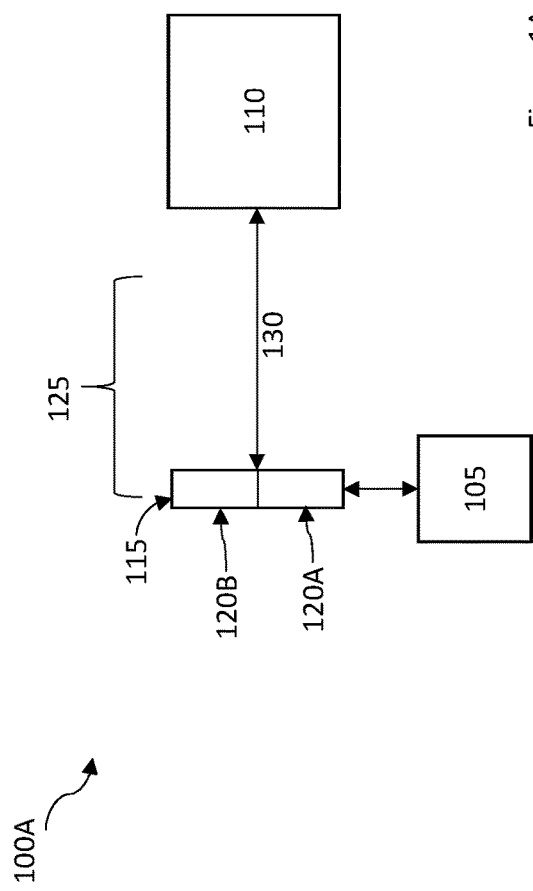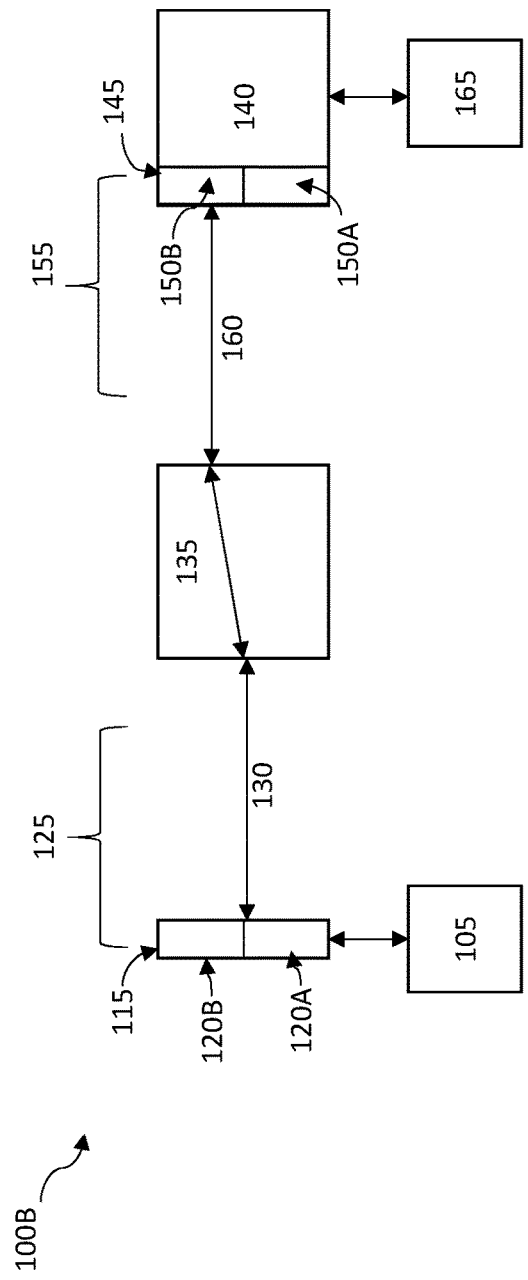

CONTROL SYSTEM MIGRATION USING INTERFACE CARD

BACKGROUND

Field devices can be used in an industrial operating environment, such as an oil and gas production facility, in relation to one or more industrial control systems which can be used to operate and control continuous or discrete control processes. Control systems can require maintenance, become functionally underperforming, and/or obsolete prompting operators to interface existing field devices to an updated, enhanced, or alternate control systems. In order to efficiently and accurately interface multiple field devices to a new or different control system, the configuration and assignment of data channels conveyed via field wiring between the field device and the first control system should be maintained in an efficient, repeatable, error-free manner.

SUMMARY

In general, devices, system, and methods are provided for migrating field device data signals from a first control system to a second control system using an interface card.

In one aspect, a system is provided. In one embodiment, the system can include a field device. The system can also include a first control system. The first control system can be coupled to multiple field devices and can include a first terminal block cable assembly. The system can also include a second control system used to replace a first control system. The second control system can include a second terminal block cable assembly. The system can further include an interface card. The interface can include a terminal board. The terminal board can include a plurality of edge connectors. A first edge connector of the plurality of edge connectors can be configured to couple to a unique field device via a first data channel of the first control system. The interface card can also include a housing which can be coupled to the terminal board and can include a plurality of terminal connectors. A first terminal connector of the plurality of terminal connectors can be configured to couple to the second control system via a second data channel of the second control system. The first terminal connector can be configured to couple to the first edge connector via a race configured on the terminal board such that data signals conveyed between the first data channel of the first control system and the second data channel of the second control system are conveyed via the trace coupling the first edge connector and the first terminal block.

In another aspect, an interface card is provided. In one embodiment, the interface card can include a terminal board including a plurality of edge connectors. A first edge connector of the plurality of edge connectors can be configured to couple to a field device via a first data channel of a first control system. The interface card can also include a housing coupled to the terminal board. The housing can include a plurality of terminal connectors. A first terminal connector of the plurality of terminal connectors can be configured to couple to a second control system via a second data channel of the second control system. The first terminal connector can be configured to couple to the first edge connector via a trace configured on the terminal board such that data signals conveyed between the first data channel of the first control system and the second data channel of the second control system are conveyed via the trace coupling the first edge connector and the first terminal block.

In another aspect, a method for migrating field device data signals from a first control system to a second control system using an interface card is provided. In one embodiment, the method can include coupling an interface card to a first terminal block cable assembly of a first control system. The first control system can be coupled to a field device. The interface card can include a plurality of edge connectors arranged on terminal board of the interface card. A first edge connectors of the plurality of edge connectors can be configured to couple to the field device via a first data channel of the first control system. The method can also include coupling the interface card to a second terminal block cable assembly of a second control system. The interface card can further include a housing, which can be coupled to the terminal board and can be configured with a plurality of terminal connectors. A first terminal connector of the plurality of terminal connectors can be configured to couple to the second control system via a second data channel of the second control system. The first terminal connector can be configured to couple to the first edge connector via a trace configured on the terminal board such that data signals conveyed between the first data channel of the first control system and the second data channel of the second control system can be conveyed via the trace coupling the first edge connector and the first terminal block. The method can further include attaching the second terminal block cable assembly to the second control system. The method can also include conveying the data signals between the field device and the second control system via the interface card.

DESCRIPTION OF DRAWINGS

These and other features will be more readily understood from the following detailed description taken in conjunction with the accompanying drawings, in which:

FIG. 1A is a diagram illustrating an exemplary embodiment of a system for conveying field device data signals into a control system;

FIG. 1B is a diagram illustrating an exemplary embodiment of a system for conveying field device data signals into a new or alternate control system;

Figure 2:
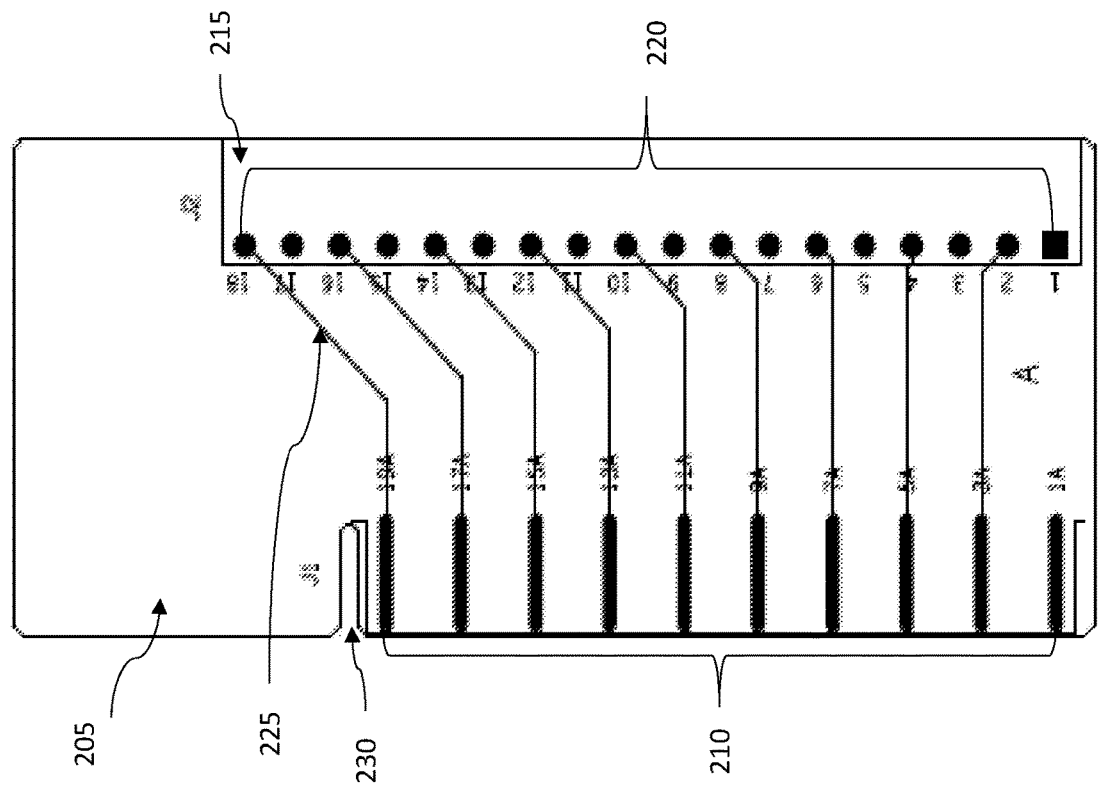
FIG. 2 is a diagram illustrating an exemplary embodiment of a front side of an interface card for use in migrating field device data signals from a first control system to a second control system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Field devices used in an industrial operating environment, such as an oil and gas production facility, can be coupled to control systems used to control, maintain, monitor and otherwise communicate with the field device. For example, a control system can be configured to control and communicate with a compressor in a liquid natural gas facility as well as a well pump motor at a well site in an oil refinery facility. Control systems can include computing devices, configured in a network, to communicate with the field devices. As control system technology advances and field devices become more sophisticated, newer control systems with enhanced capabilities may be deployed to installations of existing field devices coupled to legacy control systems which are less robust and obsolete. Operators of industrial operating environments seek to maximize production rates while minimizing resource costs and operating expenses. Migrating field devices and the data they convey from one control system to another control system can be a manually intensive and expensive process and can reduce production rates at production facility where the field device and control system is located if not performed correctly and efficiently. To be competitive, operators of the control systems seek to re-use existing components, such as existing field wiring between a control system and a particular field device.

Currently, migrating field devices from a first control system to a second or different control system, as is typically the case during an upgrade, retrofit, maintenance or enhancement project in an industrial control system configured in an industrial operating environment, can involve de-terminating all field wiring between the field device and the first control system, removing the control system cabinets, installing a new control system cabinet, and re-terminating the field wiring at the second control system so that the proper data channel assignments are preserved and maintained. As this method of migration can be error prone, operators can perform loop checks to confirm that each field device coupled to the new control system is wired to operate properly and is wired properly to the correct channel of the correct I/O module of the second or new control system. The process of de-termination and re-termination and performing loop checks can add many hours to a control system retrofit or upgrade project. For example, a single control system cabinet can require 20 to 40 hours to install, depending on the number of terminations to be made. Performing loop checks can add 10 minutes to an hour of time per field device to confirm proper installation of the field device with respect to the second or new control system. Additional configuration time, extended operational down time, and specialized resources required to perform the migration of field devices between control systems can have significant impact on the productivity and profitability of an industrial operating environment.

An improved system is provided herein which can be used to perform error-free, simple, low-cost migration of field devices and their data from a first control system to a second control system. The improved system can include an interface card configured to couple with terminal block cable assemblies of the first and second control systems. The system is configured to re-use the terminal block cable assembly of the first control system, which can then couple to the interface card and convey field device data and/or data signals to the second control system via a configurable cable included in the terminal block cable assembly of the second control system. In this way, the data channel assignment of the first control system with respect to the field device can be maintained as the field device is operatively coupled to the second control system. The interface card and the system described herein reduce the likelihood of channel assignment errors or improper termination wiring at the new control system by providing a simple, hardware-based solution that reduces the need for specialized personnel to perform expensive de-termination/re-termination and loop checking operations during control system upgrades or refurbishment projects.

Embodiments of systems, devices, and methods for migrating field device data signals from a first control system to a second control system using an interface card are discussed herein. However, embodiments of the disclosure can be employed for migrating other types of devices configured to connect to one or more control systems, as well as embodiments where device data can be conveyed from a first processing system to a second processing system while maintaining the communicative coupling of the data channels configured between a device and the first processing system such that the device is coupled to the second control system via the interface card and the first control system.

FIG. 1A is a diagram illustrating an exemplary embodiment of a system 100A for conveying field device data signals into a control system. As shown in FIG. 1A, the system 100A can include a field device 105 coupled to a control system 110. The control system 110 can include or be configured with one or more terminal blocks 115. Each terminal block 115 can be configured to convey data signals via a plurality of data channels, such as a first data channel shown as data channel 120A or a second data channel shown as data channel 120B. The data channels 120A and 120B can convey data between the field device 105 and the first control system 110. The system 100A also includes a terminal block cable assembly 125 configured with respect to the control system 110. The terminal block cable assembly 125 includes the terminal block 115 coupled to a cable 130. For example, the data channels 120A and 120B can convey data such as an analog input signal, an analog output signal, a digital input signal, a digital output signal, a pulse accumulation signal, a relay output signal, a speed input signal, a valve control signal, or a signal from a resistance temperature detector.

FIG. 1B, is a diagram illustrating an exemplary embodiment of a system 100B for conveying field device data signals into a new or alternate control system than the control system shown in system 100A of FIG. 1A. The system 100B can convey field device data signals to the new, different, or alternate control system without disturbing the field device 105 coupled to terminal block cable assembly 125 which was originally used to connect a field device to the control system 110 shown in FIG. 1A. For example, as compared to FIG. 1A, in FIG. 1B, the control system 110 has been removed, but the field device wiring to the terminal block cable assembly 125 is maintained. The terminal block cable assembly 125 can be coupled to an interface card 135 so that field device data signals or control signals associated with the field device 105 can be conveyed to a new or alternate control system, such as control system 140. As will be described herein, the interface card 135 can be configured to convey data signals, including field device data signals, control signals, or computer-readable, executable instructions, to and from field devices via a new, different, or second control when a first control system is no longer suitable for use with the field device 105.

The system 100B also includes a control system 140. The control system 140 can include or be configured with one or more terminal blocks 145. Each terminal block 145 can be configured to convey data signals via a plurality of data channels, such as a first data channel shown as data channel 150A or a second data channel shown as data channel 150B. The data channels 150A and 150B can convey data between the field device 105 and the control system 140 via the interface card 135 and the terminal block 115 that was previously connected to the control system 110 of FIG. 1A.

The system 100B also includes a second terminal block cable assembly 155 configured with respect to the control system 140. The terminal block cable assembly 155 includes the terminal block 145 coupled to a cable 160. The terminal block cable assembly 155 can be coupled to an interface card 135 so that field device data signals or control signals associated with the field device 105 can be conveyed to the control system 140, without disturbing field device 105 terminations to terminal block 115 previously connected to control system 110 as shown in FIG. 1A. As will be described herein, the interface card 135 can be configured to convey data signals, including field device data signals, control signals, or computer-readable, executable instructions, to and from field devices via a second control system 140 which can be different than the first control system 110 of FIG. 1A.

As further shown in FIG. 1B, the system 100B can also include one or more computing devices 165. The computing device 165 can include a monitor or display, a memory storing computer readable, executable instructions which when executed are configured to perform methods described herein. The computing device 165 can include one or more input devices used to receive inputs which can cause the computing device 165 to execute the computer readable, executable instructions to perform methods for migrating data signals associated with a field device, such as field device 105 from a first control system to a second control system via an interface card, such as interface card 135 described herein.

The field device 105 can include a variety of equipment, machinery, or components used in oil and gas production facilities and operations. For example, the field device 105 can include pressure transmitters, flow transmitters, limit switches, or any number of electronic or electrical field device instruments. The field device 105 can be coupled to a control system via field wiring that is received within a termination cabinet configured within the control system. The termination cabinet can be further connected via a connector cable to an I/O interface configured within the control system. In some embodiments, the connecter cable can be cable 130 that can coupled to the interface card 135 as shown in FIG. 1B. The termination cabinet can include one or more terminal blocks, such as the terminal blocks 115 and 145 shown in FIG. 1B. The terminal blocks can be included with the cable 130 in a first terminal block cable assembly 125 which can be coupled with the interface card 135 described herein for migrating field device data signals from a first control system, such as control system 110 shown in FIG. 1A, to a second control system, such as control system 140 shown in FIG. 1B. The interface card 135 can be used to migrate field device data signals between two control systems without needing to de-terminate the field wiring at the first control system 110 and re-terminate the field wiring at the second control system 140. This can avoid connection or re-connection errors. Connection and re-connection errors can be mitigated by performing loop checks over the data channels which when executed can determine whether or not a field device is wired correctly to the proper I/O channel of a control system. Significant labor and computer resources can be required to de-terminate and re-terminate field wiring and perform loop checks. Loop checks can also require extended down time or outages of the field devices 105 and/or systems 100. These issues can be addressed using the system 100B, interface card 135, and methods described herein to maintain the existing field wiring coupling a field device 105 to a first control system 110 while migrating to a new, alternate, or second control system 140. Migrating to a second control system 140 removes the need to maintain a first control system 110.

The first control system 110 can include processing components, memory devices, and computer-readable, executable instructions which can be used to manage or control field devices to which they are coupled. For example, the instructions can be configured to perform loop checks, implement ladder logic, and text algorithms, as well as generate operator administrative graphics and functionality, alarm and condition monitoring functionality and data trending/reporting functionality. Data can be transmitted to and from field devices via data channels 120 configured within the first control system 110. The data channels 120 can connect to field devices 105 via terminal blocks 115 and/or I/O interfaces configured within the first control system 110. A plurality of first control systems 110 can be networked together via a proprietary data network. A variety of obsolete or legacy control systems can still be found in operation. These legacy control system can utilize terminal blocks to interface with various field devices. The legacy control systems can be configured with cabling methods that convey the electrical signals from the terminal block to a chassis mounted circuit board. However, the circuit board may not include the proper termination block configuration to accept the electrical signals from the field devices and can require a specialized cable. In newer control systems, the field device wiring can be directly interfaced to one or more I/O modules without the need for specialized interface cables. In some embodiments, the first control system 110 can include a legacy or obsolete control system, such as the Westinghouse Distributed Processing Family (WDPF) control system by Westinghouse Electric Corporation of Pittsburgh, Pa. In other embodiments, the first control system 110 can include a legacy or obsolete control system, such as the WEStation (WDPF II) control system by Westinghouse Electric Corporation of Pittsburgh, Pa.

The interface card 135 can couple to the cable 130 of the first terminal block cable assembly 125 of the first control system 110 to provide an I/O interface to the second control system 140 via the cable 160 of the second terminal block cable assembly 155. In this way, the field wiring coupling the field device 105 to the first control system 110 can be maintained when it is desirable to transmit or receive data between the field device 105 and the second control system 140. The cable 160 of the second terminal block cable assembly 155 can be a customized cable that is specifically configured in relation to the data channels of the first control system 110 and the second control system 160. Additional details of the interface card 135, as well as the cables 130 and 160 which are coupled to the interface card 135, will be provided later in regard to FIGS. 2-4.

The second control system 140 shown in FIG. 1B, can also include processing components, memory devices, and computer-readable, executable instructions which can be used to manage or control field devices to which they are coupled. For example, the instructions can be configured to generate operator administrative graphics and functionality, alarm and condition monitoring functionality and data trending/reporting functionality. Data can be transmitted to and from field devices 105 via data channels 150 configured within the second control system 140. The data channels 150 can connect to field device 105 via terminal blocks 145 or I/O interfaces configured within the second control system 140. The second control system 140 can include operator and engineer consoles, such as would be configured on computing device 165 of FIG. 1B. A plurality of control systems can be networked together via a dedicated control system network. Newer control systems, can use flexible hardware packaging to allow field devices to directly to connect to I/O modules without the need for specialized interface cables. In addition, the flexible hardware packaging of newer control systems may include exposed circuit boards, which are enclosed within a chassis. For example, the newer control systems can include a Nexus control system by Baker Hughes, of Houston, Tex. In some embodiments, the Nexus control system can be configured as the second control system.

FIG. 2 is a diagram illustrating an exemplary embodiment of a front side (e.g., side "A") of an interface card, such as the interface card 135 shown and described in relation to FIG. 1B. The interface card shown in FIG. 2, includes a terminal board 205 on which a plurality of edge connectors 210 are configured. The terminal board 205 also includes a housing 215 configured with a plurality of terminal connectors 220. Each of the plurality of edge connectors is connected to a corresponding terminal connector (and vice versa) via a trace 225 configured within or on the terminal board 205. The terminal board 205 can include a plurality of traces, such as trace 225, each of which can convey data signals between each edge connector and the corresponding terminal connector. As shown in FIG. 2, each trace 225 can connect a first edge connector of the plurality of edge connectors 210 to a first terminal connector of the plurality of terminal connectors 220. For example, trace 225 communicatively couples edge connector "19A" with terminal connector "18". In this way, a data channel associated with a field device and conveyed via field wiring to a first control system can be migrated to a second control system by way of the interface card, such as the interface card 135 shown in FIG. 1B. The data channel can convey data via the edge connector "19A" and over trace 225 to the terminal connector 18. When the interface card and each of the plurality of terminal connectors 220 are coupled to a second control system 140 via the second terminal block cable assembly, such as the second terminal block cable assembly 155 shown and described in FIG. 1B, the data channel can convey data between the field device and the second control system 140 without needing to modify the field wiring configuration of terminal block cable assembly 125 which was previously connected to the first control system 110 shown in FIG. 1A.

As shown in FIG. 2, the interface card can be configured with a plurality of edge connectors 210 which correspond to a data channel I/O arrangement associated with a first control system, that utilizes a similar connection method of field devices. Additionally, the interface card of FIG. 2, can be configured with a plurality of terminal connectors 220 which correspond to a data channel I/O arrangement associated with a second control system. In this way, the interface card can be standardized to interface between two control systems and when migrating field device data from the first control system to the second control system, only the cable 160 of FIG. 1B, is required to be customized to appropriately map the data channel I/O arrangement of the second control system to the data channel configuration conveyed via the plurality of terminal connectors 220. The interface card shown in FIG. 2, can also include a notch 230 configured to facilitate insertion, removal, fitment and/or coupling of the interface card with the first terminal block cable assembly 125 of the first control system 110.

Figure 3:
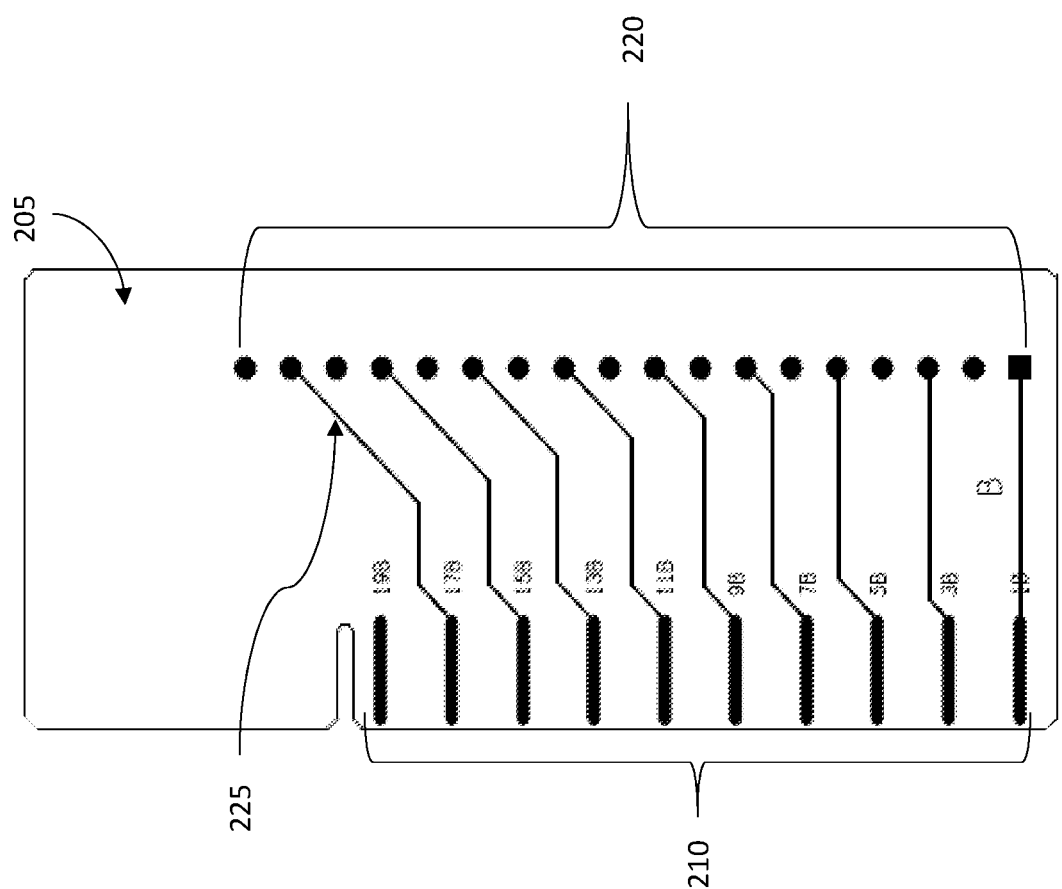
FIG. 3 is a diagram illustrating an exemplary embodiment of a rear side of an interface card for use in migrating field device data signals from a first control system to a second control system.

FIG. 3 is a diagram showing an exemplary embodiment of a rear side (e.g., side "B") of an interface card, such as the interface card 135 shown and described in relation to FIGS. 1 and 2. The diagram of the rear side of the interface card illustrates the terminal board 205, the plurality of edge connectors 210, the plurality of terminal connectors 220, and the trace 225. Traces 225 are used to provide electrical continuity from edge connectors 210 to the terminal block 215 which then is connected via pre-defined cable 225 to a second control system 140.

Figure 4:
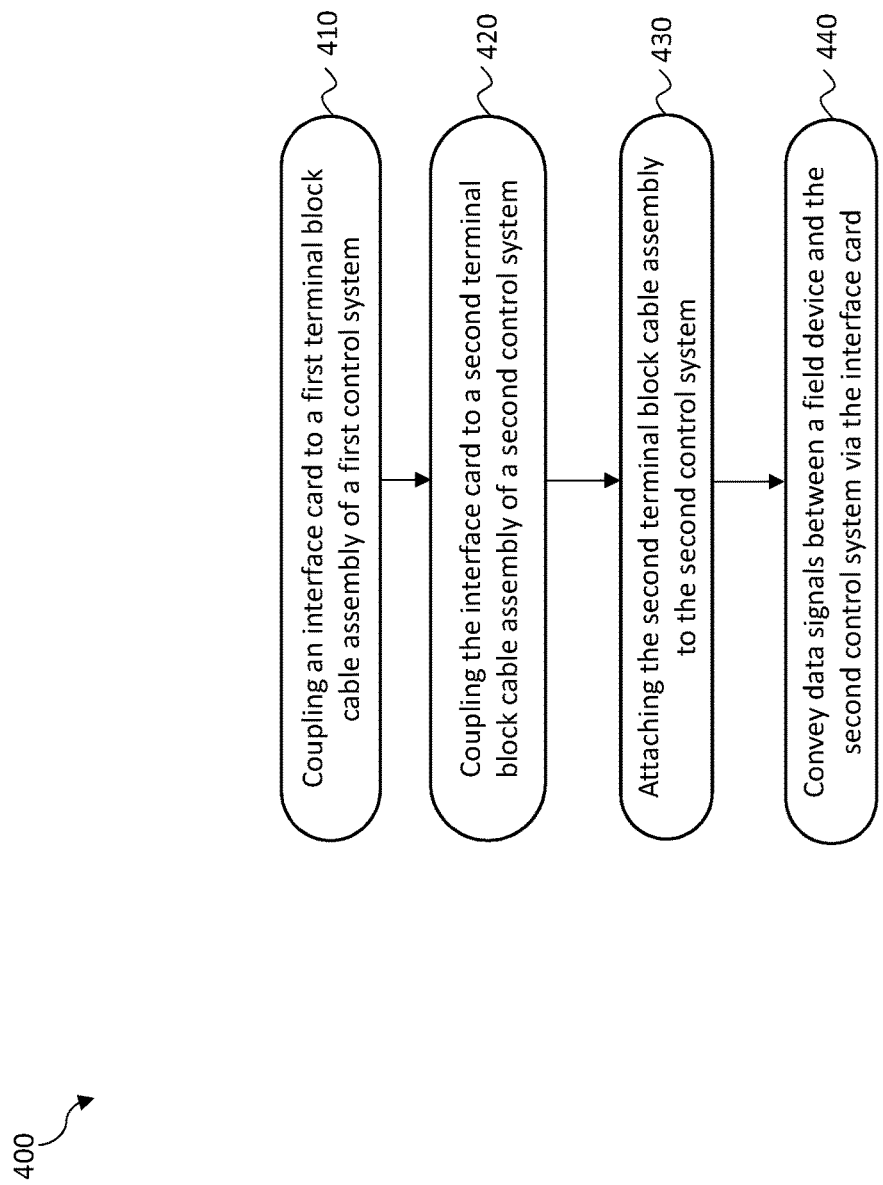
FIG. 4 is a diagram of an exemplary method for use in migrating field device data signals from a first control system to a second control system using the interface card described herein.

FIG. 4 is a diagram 400 of a method for migrating field device data signals from a first control system to a second control system using the interface card described herein. For example, the interface card 135 shown and described in relation to FIGS. 1A-3 can be used to convey data such as field device data signals or control data signals associated with a field device to a second control system, such as control system 140 while maintaining the existing or previous field wiring connections established with respect to a first control system, such as control system 110. The interface card 135 and it's method of use as shown and described in relation to the steps of diagram 400 can reduce the amount of time and computing resources necessary to de-terminate and re-terminate data channel connections from a first control system to a second control system when it is preferred to migrate control and management of the field device to the second control system. The interface card 135 and it's method of use as shown and described in relation to the steps of diagram 400 can also reduce errors introduced during such a migration and can enable the migration to be performed more efficiently and consistently without requiring significant down time for the field device, control systems, or the operational environment in which the field device and control system are deployed.

As shown in FIG. 4, in step 410, the interface card 135 is coupled to a first terminal block cable assembly 125 of a first control system 110. The first control system terminal blocks 115 are already coupled to the first control system 110 via terminal block cable assembly 125. The interface card 135 can include a plurality of edge connectors 210 as shown and described in relation to FIG. 2, which can couple to a connector cable 130 of the first terminal block cable assembly 125. The connector cable 130 can include a plurality of slots to receive the plurality of edge connectors 210.

As shown in step 420, the interface card 135 is coupled to a second terminal block cable assembly 155 of a second control system 140 shown in FIG. 1B. The plurality of terminal connectors 220 shown and described in relation to FIG. 2, can couple to a cable 160 of the second terminal block cable assembly 155. The cable 160 can be appropriately configured so that each data channel conveyed via each of the plurality of terminal connectors is matched with the appropriate data channel of the second control system and can also be configured to convey specific data types such as analog inputs, analog outputs, or the like.

As further shown in step 430, the second terminal block cable assembly 155 is attached to the second control system 140. For example, the cable 160 can be coupled to the terminal block 145 of the second control system 140.

As shown in step 440, having coupled the interface card 135 to the first control system 110 and to the second control system 140, via coupling the plurality of edge connectors 210 to the cable 130 of the first terminal block cable assembly 125 and coupling the plurality of terminal connectors 220 to the cable 160 of the second terminal block cable assembly 155, data signals can be conveyed between the field device 105 and the second control system 140 via the interface card 135. In some embodiments, the second control system 140 or the computing device 165 can be configured with a hardware configuration tool. The hardware configuration tool can include computer-readable, executable instructions stored in memory of the second control system 140 and/or the computing device 165 which when executed can cause the second control system to convey data signals between the field device 105 and the second control system 140.

The improved system described herein addresses the technical problem of ensuring maintenance of data channel configurations between a field device and a new control system. Preserving the assignments of individual data channels with respect to an associated field device can prevent errors when migrating control and data I/O from a first control system to a second control system, such as in replacing or upgrading legacy control system equipment. The errors can be costly in terms of manpower, computing resources, and production rates of the industrial operating environment in which the field devices and control systems may be deployed. Computing resources and logic, such as loop checks, must be utilized to verify proper assignment of data channels or maintenance of data channel assignment when migrating a field device from being controlled by a first control system to being controlled by a second control system. The exemplary technical effects of the methods, systems, and devices described herein include, by way of non-limiting example, providing an interface card capable of migrating data channel assignments between a field device and two uniquely configured control systems By providing an interface card configured to couple to a first control system termination assembly so as to facilitate data signal conveyance and data channel assignment preservation when coupling the field device to a second control system, the interface card, systems and methods of using the interface card can reduce erroneously assigned data channels between the field device and the second control system, so that the data channels and use of the field device itself can be immediately and properly configured with respect to the second control system and thus improving the operating performance time of the field device.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system comprising:
   a field device;
   a first control system, the first control system coupled to the field device and including a first terminal block cable assembly;
   a second control system, the second control system including a second terminal block cable assembly; and
   an interface card including,
      a terminal board including a plurality of edge connectors, wherein a first edge connector of the plurality of edge connectors is configured to couple to the field device via a first data channel of the first control system; and
      a housing, coupled to the terminal board and including a plurality of terminal connectors, wherein a first terminal connector of the plurality of terminal connectors is configured to couple to the second control system via a second data channel of the second control system and the first terminal connector is configured to couple to the first edge connector via a trace configured on the terminal board such that data signals conveyed between the first data channel of the first control system and the second data channel of the second control system are conveyed via the trace coupling the first edge connector and the first terminal block,
      wherein the interface card is configured to convey the data signals between the field device and the second control system without de-terminating the first data channel of the field device from the first control system and re-terminating the first data channel of the field device with the second control system.

2. The system of claim 1, wherein the first terminal block cable assembly is configured to convey the data signals from the field device to the first edge connector via the first data channel.

3. The system of claim 1, wherein the second terminal block cable assembly is configured to convey the data signals from the second control system to the first terminal connector via the second data channel.

4. The system of claim 1, wherein the first terminal block cable assembly includes an interface cable connecting one or more terminal blocks of the first control system to an I/O circuit board mounted within a chassis of the first control system, wherein the I/O circuit board includes a card edge connector configuration that is specific to the first control system.

5. The system of claim 1, wherein the second terminal block cable assembly includes an interface cable directly connecting one or more terminal blocks of the second control system to an I/O circuit board mounted within the second control system.

6. The system of claim 1, wherein the interface card is configured to convey the data signals between the field device and the second control system while maintaining a coupling of the first data channel of the field device at the first control system.

7. The system of claim 1, wherein the field device includes at least one of an electronic transmitter, a control valve positioner, a thermocouple, and a switch.

8. The system of claim 3, wherein the second terminal block cable assembly is configured to convey at least one of an analog input signal, an analog output signal, a digital input signal, a digital output signal, a pulse accumulation signal, a relay output signal, a speed input signal, a valve control signal, or a signal from a resistance temperature detector.

9. An interface card comprising:
a terminal board including a plurality of edge connectors, wherein a first edge connector of the plurality of edge connectors is configured to couple to a field device via a first data channel of a first control system; and
a housing, coupled to the terminal board and including a plurality of terminal connectors, wherein a first terminal connector of the plurality of terminal connectors is configured to couple to a second control system via a second data channel of the second control system and the first terminal connector is configured to couple to the first edge connector via a trace configured on the terminal board such that data signals conveyed between the first data channel of the first control system and the second data channel of the second control system are conveyed via the trace coupling the first edge connector and the first terminal block,
wherein the interface card is configured to convey the data signals between the field device and the second control system without de-terminating the first data channel of the field device from the first control system and re-terminating the first data channel of the field device with the second control system.

10. The interface card of claim 9, wherein the first control system includes a first terminal block cable assembly configured to convey the data signals from the field device to the first edge connector via the first data channel.

11. The interface card of claim 9, wherein the second control system includes a second terminal block cable assembly configured to convey the data signals from the second control system to the first terminal connector via the second data channel.

12. The interface card of claim 9, wherein the interface card is configured to convey data between the field device and the second control system while maintaining a coupling of the first data channel of the field device at the first control system.

13. The interface card of claim 9 further comprising a front-side of the terminal board configured with 10 front-side edge connectors and 18 front-side terminal connectors configured in the housing, and a back-side of the terminal board configured with 10 back-side edge connectors and 18 back-side terminal connectors, wherein 9 of the 10 front-side edge connectors are respectively coupled to 9 of the 18 front-side terminal connectors via 9 individual traces configured within the front-side of the terminal board and 9 of the 10 back-side edge connectors are respectively coupled to 9 of the 18 back-side terminal connectors via 9 individual traces configured within the back-side of the terminal board.

14. The interface card of claim 10, wherein the first terminal block cable assembly includes an interface cable directly connecting one or more terminal blocks of the first control system to an I/O circuit board mounted within a chassis of the first control system, wherein the I/O circuit board includes a card edge connected configuration that is specific to the first control system.

15. The interface card of claim 11, wherein the second terminal block cable assembly is configured to convey at least one of an analog input signal, an analog output signal, a digital input signal, a digital output signal, a pulse accumulation signal, a relay output signal, a speed input signal, a valve control signal, or a signal from a resistance temperature detector.

16. The interface card of claim 11, wherein the second terminal block cable assembly includes an interface cable directly connecting one or more terminal blocks of the second control system to an I/O circuit board mounted within the second control system.

17. The interface card of claim 10 further comprising a notch configured within the terminal board to facilitate coupling the interface card with the first terminal block cable assembly of the first control system.

18. A method comprising:
coupling an interface card to a first terminal block cable assembly of a first control system, the first control system coupled to a field device, wherein the interface card includes a plurality of edge connectors arranged on a terminal board of the interface card, wherein a first edge connector of the plurality of edge connectors is configured to couple to the field device via a first data channel of the first control system;
coupling the interface card to a second terminal block cable assembly of a second control system, wherein the interface card further includes a housing, coupled to the terminal board and configured with a plurality of terminal connectors, wherein a first terminal connector of the plurality of terminal connectors is configured to couple to the second control system via a second data channel of the second control system and the first terminal connector is configured to couple to the first edge connector via a trace configured on the terminal board such that data signals conveyed between the first data channel of the first control system and the second data channel of the second control system are conveyed via the trace coupling the first edge connector and the first terminal block;
attaching the second terminal block cable assembly to the second control system; and
conveying the data signals between the field device and the second control system via the interface card without de-terminating the first data channel of the field device from the first control system and re-terminating the first data channel of the field device with the second control system.

19. The method of claim 18, wherein the first terminal block cable assembly is configured to convey the data signals from the field device to the first edge connector via the first data channel.

20. The method of claim 18, wherein the second terminal block cable assembly is configured to convey the data signals from the second control system to the first terminal connector via the second data channel.

21. The method of claim 18, wherein the first terminal block cable assembly includes an interface cable directly connecting one or more terminal blocks of the first control system to an I/O circuit board mounted within a chassis of the first control system, wherein the I/O circuit board includes a card edge connected configuration that is specific to the first control.

22. The method of claim 18, wherein the second terminal block cable assembly includes an interface cable directly connecting one or more terminal blocks of the second control system to an I/O circuit board mounted within the second control system.

23. The method of claim 18, wherein the interface card is configured to convey the data signals between the field device and the second control system while maintaining a coupling of the first data channel of the field device at the first control system.

24. The method of claim 20, wherein the second terminal block cable assembly is configured to convey at least one of an analog input signal, an analog output signal, a digital input signal, a digital output signal, a pulse accumulation signal, a relay output signal, a speed input signal, a valve control signal, or a signal from a resistance temperature detector.

* * * * *